US005165109A

United States Patent [19]

Han et al.

[11] Patent Number: 5,165,109

[45] Date of Patent: Nov. 17, 1992

[54] MICROWAVE COMMUNICATION ANTENNA

[75] Inventors: Ching C. Han, Los Altos Hills; James M. Janky, Sunnyvale, both of Calif.

[73] Assignee: Trimble Navigation, Sunnyvale, Calif.

[21] Appl. No.: 751,658

[22] Filed: Aug. 22, 1991

Related U.S. Application Data

[63] Continuation of Ser. No. 299,006, Jan. 19, 1989, abandoned.

[51] Int. Cl.[5] .................... A01Q 1/380; A01Q 13/080

[52] U.S. Cl. ............................. 343/700 MS; 343/829

[58] Field of Search ................ 343/700 MS, 778, 829, 343/846

[56] References Cited

U.S. PATENT DOCUMENTS

| | | | |
|---|---|---|---|
| 2,996,713 | 8/1961 | Boyer | 343/745 |
| 3,803,623 | 4/1974 | Charlot, Jr. | 343/846 |
| 3,921,177 | 11/1975 | Munson | 343/846 |
| 4,151,530 | 4/1979 | Kaloi | 343/700 MS |
| 4,151,531 | 4/1979 | Kaloi | 343/700 MS |
| 4,151,532 | 4/1979 | Kaloi | 343/700 MS |
| 4,155,089 | 5/1979 | Kaloi | 343/700 MS |
| 4,157,548 | 6/1979 | Kaloi | 343/700 MS |
| 4,163,236 | 7/1979 | Kaloi | 343/700 MS |
| 4,170,013 | 10/1979 | Black | 343/700 MS |
| 4,251,817 | 2/1981 | Kimura et al. | 343/700 MS |
| 4,255,730 | 3/1981 | Sekine et al. | 333/247 |
| 4,291,311 | 9/1981 | Kaloi | 343/700 MS |
| 4,291,312 | 9/1981 | Kaloi | 343/700 MS |
| 4,316,194 | 2/1982 | De Santis et al. | 343/700 MS |
| 4,347,516 | 8/1982 | Shrekenhamer | 343/700 MS |
| 4,376,938 | 3/1983 | Toth et al. | 343/700 MS |
| 4,386,357 | 5/1983 | Patton | 343/700 MS |
| 4,398,199 | 8/1983 | Makimoto et al. | 343/700 MS |
| 4,445,122 | 4/1984 | Pues | 343/700 MS |
| 4,477,813 | 10/1984 | Weiss | 343/700 MS |
| 4,486,758 | 12/1984 | De Ronde | 343/700 MS |
| 4,527,163 | 7/1985 | Stanton | 343/700 MS |
| 4,529,987 | 7/1985 | Bhartia et al. | 343/700 MS |
| 4,538,153 | 8/1985 | Taga | 343/700 MS |
| 4,547,779 | 10/1985 | Sanford et al. | 343/700 MS |
| 4,554,549 | 11/1985 | Fassett et al. | 343/700 MS |
| 4,633,262 | 12/1986 | Traut | 343/700 MS |
| 4,641,140 | 2/1987 | Heckaman et al. | 342/371 |
| 4,644,361 | 2/1987 | Yokoyama | 343/700 MS |
| 4,660,048 | 4/1987 | Doyle | 343/700 MS |
| 4,697,189 | 9/1987 | Ness | 343/700 MS |
| 4,713,670 | 12/1987 | Makimoto et al. | 343/700 MS |
| 4,719,470 | 1/1988 | Munson | 343/700 MS |
| 4,728,962 | 3/1988 | Kitsuda et al. | 343/872 |
| 4,746,925 | 5/1988 | Toriyama | 343/713 |
| 4,761,654 | 8/1988 | Zaghloul | 343/700 MS |
| 4,792,810 | 12/1988 | Fukuzawa et al. | 343/778 |
| 4,816,835 | 3/1989 | Abiko et al. | 343/700 MS |
| 4,827,271 | 5/1989 | Berneking et al. | 343/700 MS |
| 4,843,400 | 6/1989 | Tsao et al. | 343/700 MS |
| 4,847,625 | 7/1989 | Dietrich et al. | 343/700 MS |
| 4,866,451 | 9/1989 | Chen | 343/700 MS |
| 4,878,062 | 10/1989 | Craven et al. | 343/872 |

FOREIGN PATENT DOCUMENTS

| | | | |
|---|---|---|---|
| 0012055 | 6/1980 | European Pat. Off. | 343/700 MS |
| 2202091 | 9/1988 | United Kingdom . | |
| 8103398 | 11/1981 | World Int. Prop. O. | 343/700 MS |

*Primary Examiner*—Rolf Hille
*Assistant Examiner*—Peter Toby Brown
*Attorney, Agent, or Firm*—William E. Pelton

[57] ABSTRACT

A microwave communication antenna consists of a laminated structure having an r.f. radiating conductor affixed on the top side thereof and a feed coupling network within. The r.f. radiating conductor is capacitively coupled to the feed coupling network, a portion of which is sandwiched between suitable ground plane conductors to prevent radiation losses therefrom.

26 Claims, 8 Drawing Sheets

MICROWAVE COMMUNICATION ANTENNA

This is a continuation of application Ser. No. 299,006, filed Jan. 19, 1989, now abandoned.

FIELD OF THE INVENTION

The present invention relates in general to microwave communication antennas and, in particular, to a laminated antenna structure of the microstrip or "patch" type having a low physical profile and in which the radiator patch is capacitively coupled to its feed circuits. The feed circuits are sandwiched between ground planes to avoid undesirable losses of energy through feed circuit radiation. The invention is particularly useful in miniaturization applications requiring circular polarization, wide pattern beamwidths and operation within a relatively wide bandwidth.

BACKGROUND OF THE INVENTION

Microstrip microwave communication antennas are known in the art. Such antennas consist of a microstrip signal radiator, often referred to as a "patch", which may take several suitable geometric configurations including a square, a rectangle, a ring or a circular disc. For most uses of such antennas, such as for mounting on transportable equipment or on vehicles, it is preferable that the antenna be thin and protrude either not at all or only very slightly from the surface on which it is mounted. Accordingly, patch antennas have heretofore been constructed with either a single layer dielectric substrate or, except for unusual applications, a pair of dielectric substrates. The prior emphasis on thinness has been at the cost of operational bandwidth and the need for empirical tuning adjustments.

Parallelogram, preferably square, shaped radiating elements are commonly used for patch antennas. In this form, the antenna constitutes essentially a pair of resonant dipoles formed, for example, by the opposite edges of the patch. Most commonly, the microstrip patch is of such dimensions that either pair of adjacent sides can serve as halfwave radiators, although the dimensions of the patch may vary so that the resonant dipole edges may be from a quarter wavelength to a full wavelength long.

Patch antennas of this type have been found particularly suitable for use in aircraft. U.S. Pat. No. 3,921,177 to Munson, for example, discloses a variety of microstrip antenna configurations adapted for such use. Patch antennas may also be used for portable hand-carried navigation equipment or on vehicles. In such cases, the microstrip antenna is part of a navigational system in which it may be necessary, for example, for the antenna to receive signals from a multiplicity of satellites located virtually anywhere overhead from horizon to horizon. For these purposes, it has been found that circular polarization of the r.f. signals is necessary and desirable, although persons of ordinary skill will recognize that circular polarization is a special case of elliptical polarization and that perfect circularity need not be achieved for effective circularly polarized propagation.

Heretofore, circular polarization of patch antennas has been achieved in a variety of ways. For example, circular polarization may be obtained when the input coupling point to the signal radiator patch is located within the interior of the patch, along a diagonal line from one corner of the patch to the other. As is well understood, this prior feed arrangement permits the exciting of a pair of orthogonal radiation modes with slightly different frequencies out of phase by 90 degrees. The required adjustment of the effective dimensions of the radiator patch to achieve exactly the 90 degree phase shift, either by slicing a thin strip off of one side of the patch or by manipulating small tabs formed on the edges of the patch as tiny tuning stubs, has been found heretofore to be both critical for proper performance and unduly costly. In addition, small variations in the dielectric constant of the substrate can have a significant effect on the resonant frequency and therefore on the degree of circular polarization achieved. Material and manufacturing processes have been known to introduce variations of as much as a few percent in the dielectric constant and fabricated dimensions of the patch from one production batch of printed antenna boards to another. These variations have the effect of detuning the antenna with respect to the desired operating frequency and require precise empirical and therefore costly post-manufacturing tuning adjustments on a unit-by-unit basis.

Various attempts have been made heretofore to overcome one or more of the foregoing disadvantages. For example, in the foregoing patent to Munson there is disclosed a square patch antenna being fed on two adjacent sides by a co-planar feed circuit which consists of a 90 degree phase shifting microstrip. Such an approach may be less sensitive to small variations in the dielectric constant of the fabricated patch board. However, antennas of the type disclosed by Munson require an exceptionally low-loss feedline and Munson describes his feedlines as generally constructed by printed circuit board techniques in which the branch line r.f. feed, impedance matching conductors and the r.f. radiator patch are arranged in a generally co-planar microstrip format. It has been found that antenna patches fed by such a feed circuit will be unacceptably lossy, in part because of radiation occurring from the microstrip feedline itself.

Such shortcomings in microstrip antennas having co-planar radiating elements and feeds have been recognized heretofore as, for example, in U.S. Pat. No. 4,054,874 which discloses reactive coupling of antenna elements. The bandwidth of the antenna structures so coupled has, however, been found heretofore to be unacceptably narrow. In addition, U.S. Pat. No. 4,554,549 to Fassett et al. discloses capacitively coupled patch antenna elements. For this purpose, Fassett et al disclose the use of up to three dielectric sheets to form a composite antenna structure of purported broad bandwidth capabilities. One of the dielectric sheets separates the feedline from the radiating antenna element. In another embodiment, Fassett et al utilize a parasitic antenna patch and associated thin dielectric sheet to overlie the antenna to provide a double-tuned response characteristic. However, Fassett et al fail to disclose a microstrip feedline associated with the ground plane in such a way as to act as a stripline without radiating. Thus, the Fassett et al. device would experience undesirable loss from the feedline circuit.

In U.S. Pat. No. 4,163,236 to Kaloi there is disclosed a corner fed microstrip antenna. Kaloi explains how to achieve circular polarization from a single feed line but does not show capacitive coupling to the radiator patch.

Accordingly, it is a principal object of the present invention to provide a high performance circularly polarized patch antenna excited by a non-radiating feed circuit which minimizes impedance mismatch and losses.

Another object of the present invention is to provide a high performance circularly polarized patch antenna which utilizes a stripline feed circuit to eliminate radiation losses.

Yet another object of the present invention is to provide a high performance circularly polarized patch antenna in which capacitive coupling is utilized to excite a square or rectangular microstrip radiator.

A further object of the present invention is to provide a high performance circularly polarized multi-layer patch antenna which is fed by an overlapping feed circuit in which coupling fingers are capacitively coupled to the radiator patch.

A still further object of the invention is to provide a high performance circularly polarized multi-layer patch antenna in which a large ground plane of at least approximately twice the size or about four times the area of the radiating patch is utilized substantially to enhance the bandwidth performance of the antenna.

A yet further object of the present invention is to provide a microstrip patch antenna capable of maintaining better than −25 dB return loss over a 40 MHz bandwidth range.

SUMMARY OF THE INVENTION

The foregoing and other objects of the present invention may be attained by providing, in at least one embodiment, a non-circular microstrip or patch antenna carried on the top surface of a first of a plurality of dielectric substrates assembled together to form a composite antenna. The feed circuit for the antenna consists of a pair of microstrip coupling transmission lines or fingers and a power divider and phase shifter portion realized in stripline. The coupling fingers are formed on the upper surface of a second dielectric substrate and are thereby spaced from the patch antenna by at least the thickness of the first substrate. The coupling fingers and the patch antenna are, accordingly, capacitively coupled. In the preferred embodiment, the power divider and phase shifter portion of the feed circuit is carried on the lower surface of a third dielectric substrate and is coupled to a coaxial output transmission line through a coax-to-stripline connector. The center pin of the connector may engage the stripline input in a slip joint so as to avoid stresses induced by thermal expansion of the several dielectric substrates. In the preferred embodiment, the power divider and phase shifter portion is sandwiched between upper and lower ground planes to prevent radiation therefrom at the frequencies of interest. A fourth dielectric board preferably carries one of the ground plane conductors and forms the lowermost layer of the antenna structure. The dielectric substrates are suitably bonded together to form a composite antenna structure capable of functioning over a relatively large band of selected operating frequencies.

BRIEF DESCRIPTION OF THE DRAWINGS

For a further understanding of the present invention, reference may be made to the accompanying drawings, in which.

BRIEF DESCRIPTION OF THE PREFERRED EMBODIMENTS

Figure 1:
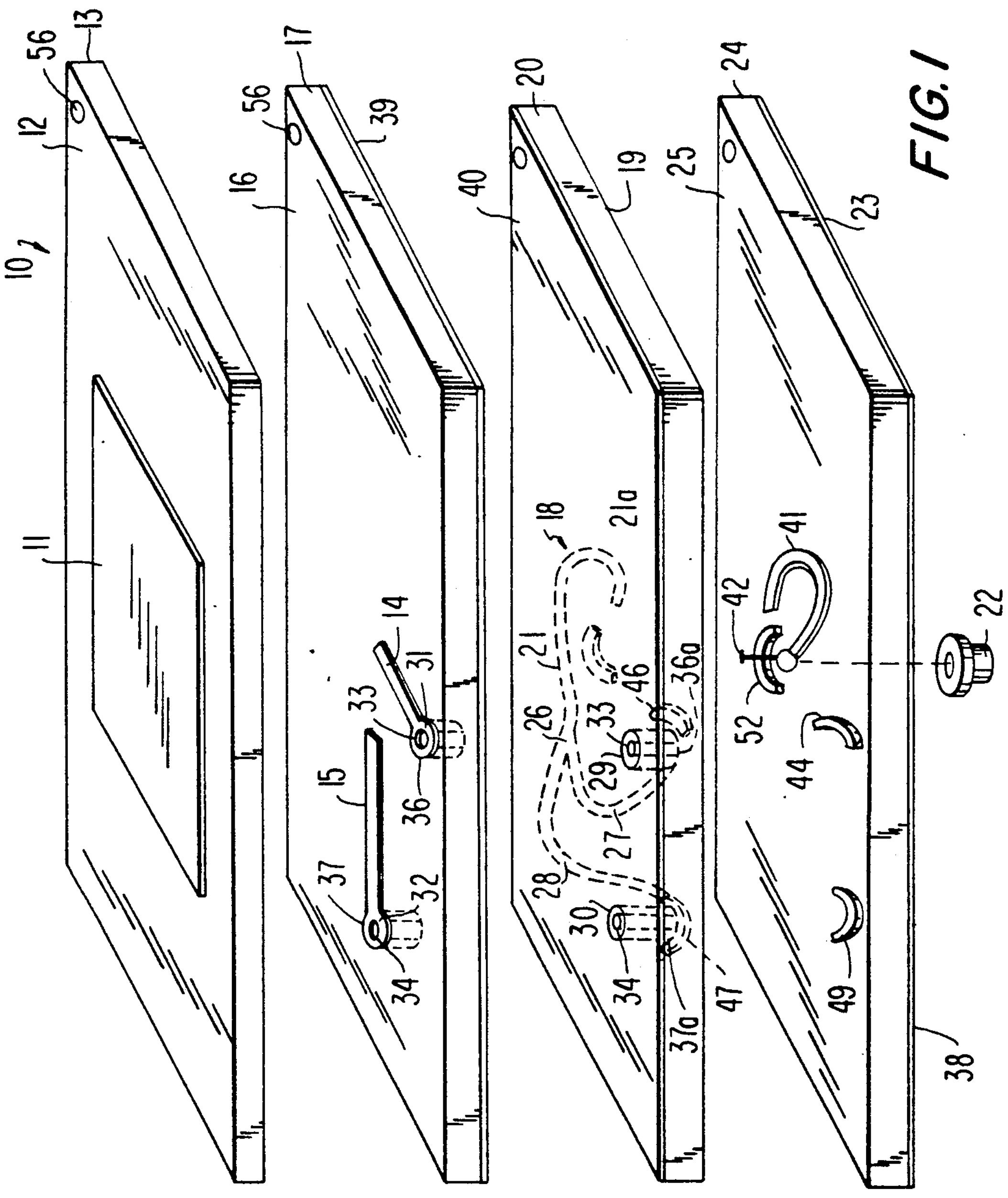
FIG. 1 is an exploded view of one multi-layer embodiment of an integrated microstrip antenna of the present invention.

With reference now to the drawings, and in particular to FIG. 1, there is shown one embodiment of an integrated microstrip antenna generally indicated by reference numeral 10 which consists of a microstrip radiator element 11 shown to be square in shape and which may be formed by recognized printed circuit or other suitable techniques on the upper surface 12 of a first dielectric substrate or board 13. Although for present purposes a square radiator element 11 is preferred, other geometric shapes may be utilized, as desired, without departing from the scope of the invention. The antenna element 11 is typically a thin metal preferably copper film and is commonly referred to as a "patch".

In the present embodiment, the dielectric board 13 is of the printed circuit board type, the length and width dimensions of which are such that its surface area is approximately four times that of the patch 11. The board 13 is preferably constructed of a standard teflon-fiberglass composition commonly available in the industry and has a dielectric constant of about 2.17. The thickness of the board 13 is preferably such as to achieve a significant bandwidth response in the antenna. This may be accomplished for the foregoing materials, for example, when the substrate is about 0.125 inches thick, although other thickness dimensions may also be found to be suitable. The selection of high quality dielectric materials results in the least loss at the frequencies of interest but a variety of different dielectric materials including lossy types may be used without departing from the scope of the invention.

The patch 11 is of generally conventional construction, the geometry of which is suited to the nature of the r.f. signals to be propagated. For example, where circularly polarized signals are to be transmitted or received the patch 11 is preferably truly square in shape and has fabricated dimensions which are such that any of the pairs of adjacent side edges thereof can serve as half-wave radiators at the frequencies of interest, in accordance with well understood principles. It is desirable that the resonant modes of the patch be the same in both orthogonal planes.

Substantially circular polarization of the patch 11 may be achieved in various ways. For example, the patch may be fed with suitable r.f. currents from one of its corners (not shown). In that event, while the patch is generally square, it may be necessary that one side dimension be slightly different from its adjacent side so that circularly polarized radiation fields may be propagated.

In the present embodiment, circularly polarizated radiation fields are achieved by driving adjacent side edges of the patch with signals shifted in phase by 90 degrees with respect to each other. The patch 11 may be varied in size from a quarter wavelength at the frequencies of interest to a full wavelength thereof. However, for those uses to which the present invention is likely to be put, the half-wavelength dimension (as measured in effective dielectric constant) is preferred.

Figure 2:
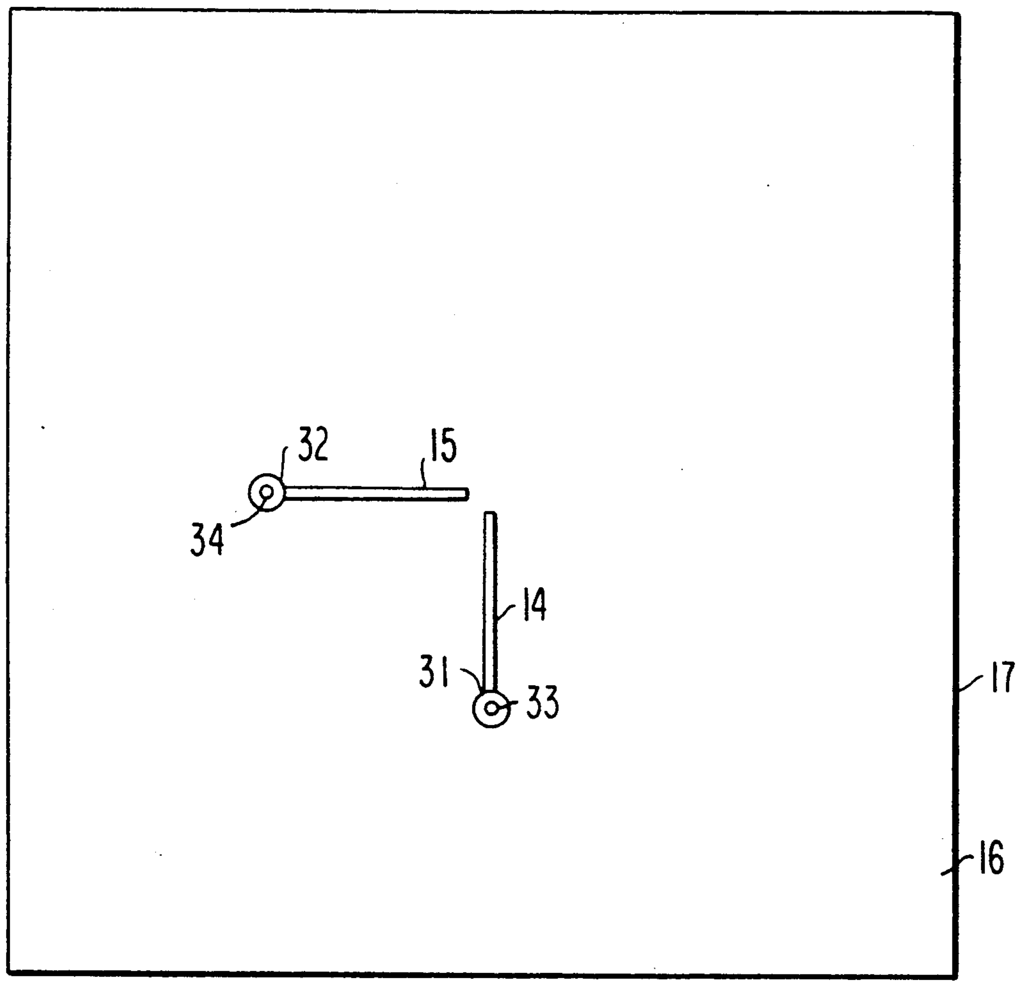
FIG. 2 is a plan view of the upper surface of a second dielectric layer of the antenna of FIG. 1.

In the present embodiment, as depicted in FIGS. 1 and 2, the patch 11 is driven by a pair of capacitively coupling transmission lines or fingers 14 and 15, which are preferably formed as microstrips on the upper surface 16 of a second dielectric substrate or board 17. It will be understood that the coupling fingers 14 and 15 may be carried elsewhere, for example on the undersurface of the dielectric board 13, as desired, without departing from the scope of the invention. The second dielectric board 17 is preferably identical in composition, size, shape, and dielectric constant to the first dielectric board 13. The coupling fingers 14 and 15 are configured and positioned relative to each other and with respect to the patch 11 so as to be capable of exciting selected pairs of adjacent edges of the patch thereby to provide the desired circular polarization. When the antenna is assembled in its composite form, and the lower surface of the board 13 and the upper surface 16 of the board 17 are suitably bonded together, as described below, the coupling fingers 14 and 15 and the patch 11 are in separate but parallel planes spaced apart by approximately the thickness of the dielectric board 13. Accordingly, the fingers 14 and 15 are capacitively coupled to the patch 11 and thereby provide a truly high performance impedance match to the patch.

Figure 5:
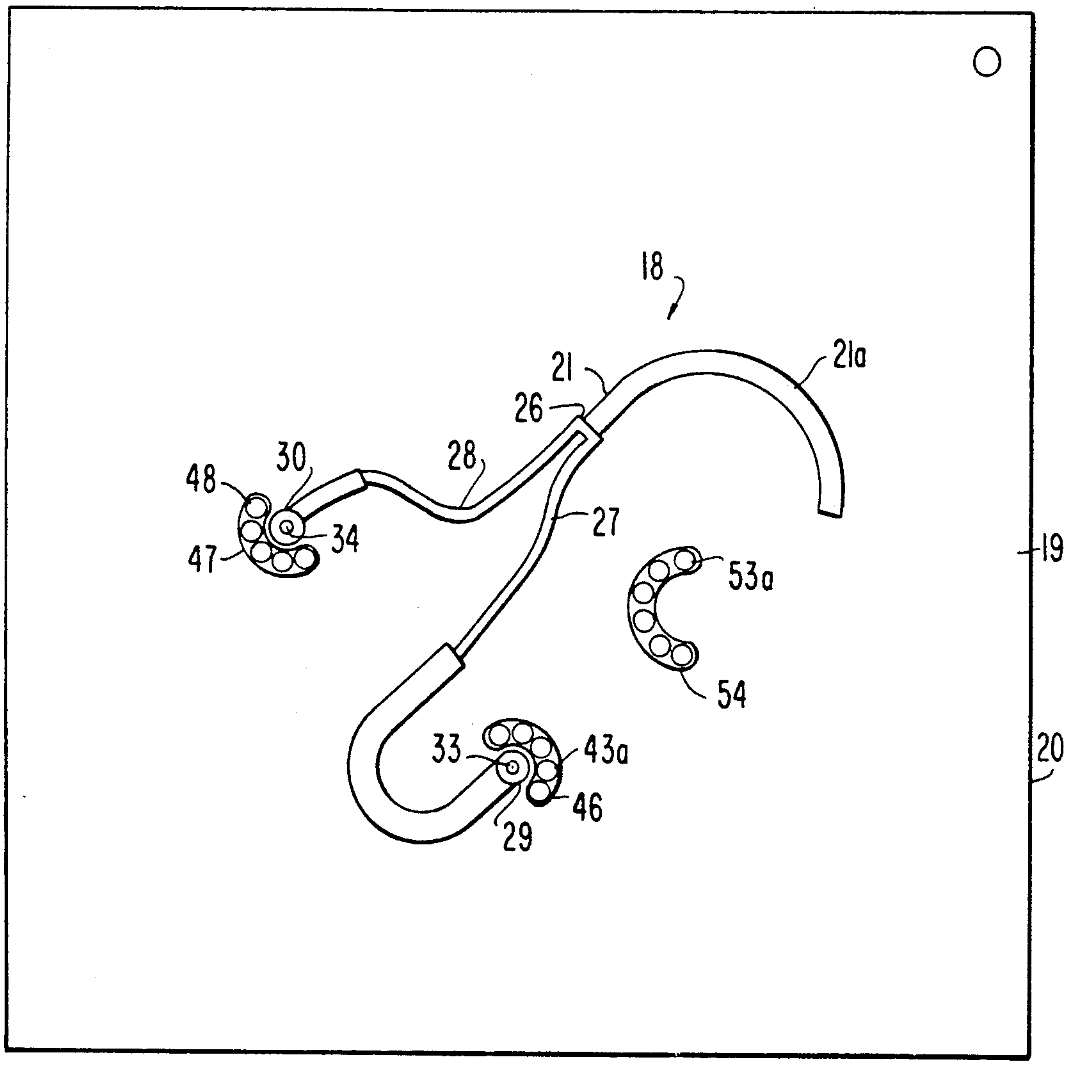
FIG. 5 is a plan view of the lower surface of the dielectric layer of FIG. 4 showing a power divider and phase shifter microstrip circuit.

Referring now to FIGS. 1 and 5, a corporate feed network for the patch 11 is generally indicated by reference numeral 18 and is preferably formed on the lower surface 19 of a third dielectric substrate or board 20. The dielectric board 20 may be identical in size, shape composition and dielectric constant to the dielectric boards 13 and 17 but is preferably somewhat thinner, e.g. on the order of 0.062 inches.

As shown in FIGS. 1 and 5, the feed network 18 consists of a single transmission line portion or trace 21 having a preferably smoothly curved output end portion 21*a*. As described below, the output portion 21*a* is adapted for suitable coupling to a standard coax-to-stripline connector 22. In the present embodiment, the connector 22 is mounted on the bottom surface 23 of a fourth dielectric substrate 24 the upper surface 25 of which, as described below, is suitably bonded to the lower surface 19 of the board 20.

Referring to FIG. 5, at a point indicated by reference numeral 26, the transmission line trace 21 divides in a known manner into a pair of segmented transmission line sections 27 and 28. The line sections 27 and 28 are configured so that one is longer than the other by a predetermined amount thereby to define an integrally formed printed circuit phase-shifter circuit with each line section terminating respectively at one of a pair of relatively spaced apart feed points 29 and 30. As a result of the difference in length between the segmented line sections 27 and 28, the r.f. currents delivered, as described below, to the coupling fingers 14 and 15 have equal power but a relative phase difference of 90 degrees. Accordingly, the corporate feed network 18, consisting of integral line sections 21, 21*a*, 27 and 28, defines a power divider and phase shifter circuit by which the desired circular polarization in the radiation pattern from the antenna patch 11 is attained.

Referring to FIGS. 1, 2 and 5, the antenna structure when assembled is such that the terminal feed points 29 and 30 of the differentiated circuit traces 27 and 28 respectively are situated directly beneath but vertically spaced apart from corresponding feed points 31 and 32 formed respectively on each of the coupling fingers 14 and 15. Suitable electrical connection between the feed points 29, 31 and 30, 32 may be accomplished in a variety of ways known to those skilled in the art. These could include the use of electrically conducting pins (not shown), for example from Sma-type r.f. coaxial connectors, soldered at the corresponding feed points. Appropriate conducting pins may also be used together with suitable female contacts (not shown) soldered to the coupling fingers 14 and 15 at the respective feed points 31 and 32 so as to form an electrically conducting slip joint. Such techniques would tend to avoid or to minimize any cracks at the joints between the pins and their associated circuit segments, since the pins are slidable relative to the dielectrics with changes in dielectric thickness over operational temperature ranges.

Figure 3:
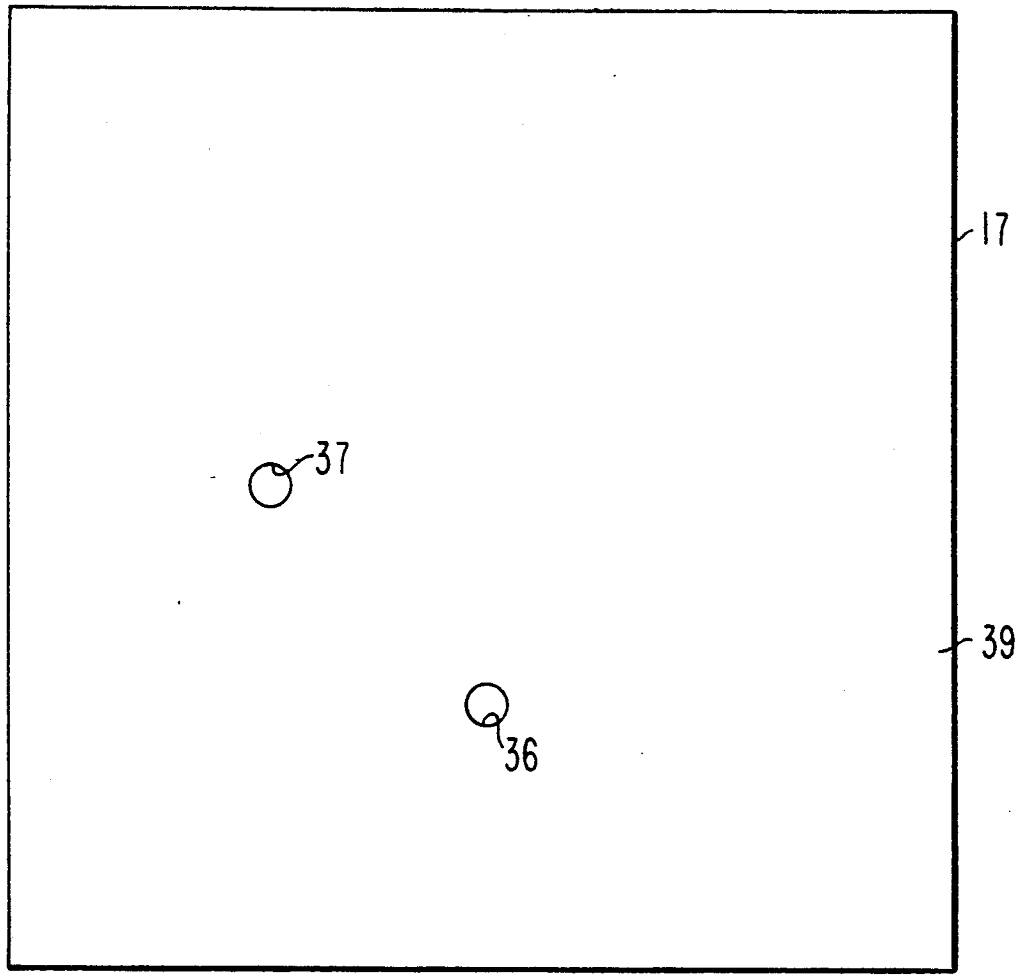
FIG. 3 is a plan view of the lower surface of the dielectric layer of FIG. 2.
Figure 4:
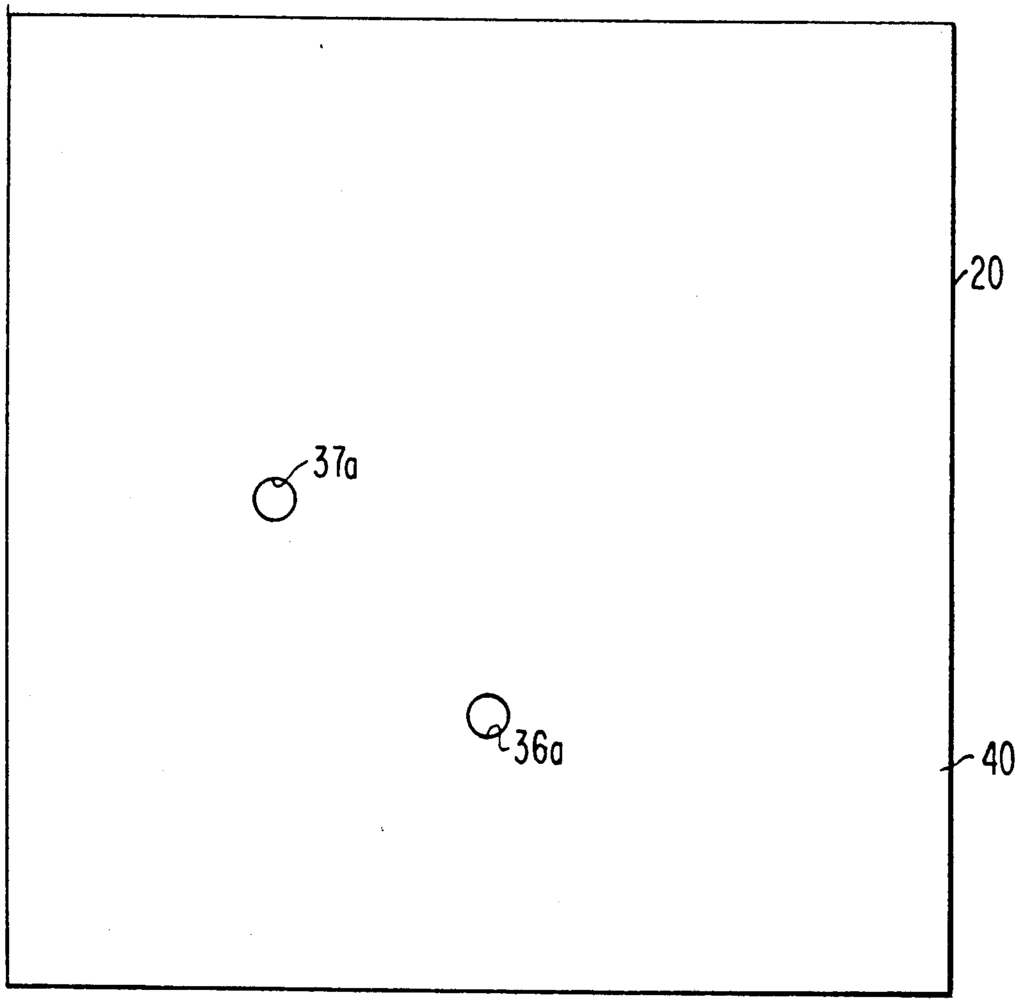
FIG. 4 is a plan view of the upper surface of a third dielectric layer of the antenna of FIG. 1.

For the present embodiment, it is preferred that the electrical connection between the feed points 29, 31 and 30, 32 be made by using eyelets 33 and 34 respectively, as depicted in broken lines in FIG. 1. Each of the eyelets comprises a short hollow cylinder adapted to pass through an associated pair of corresponding clearance holes formed in each of the dielectric boards 17 and 20. As shown in FIG. 3 for example, clearance holes 36 and 37 are suitably formed in the dielectric board 17 while corresponding clearance holes 36*a* and 37*a* are formed in the dielectric board 20 (FIG. 4). The clearance holes 36, 36*a* are formed to correspond to the electrical feed point 29 while the clearance holes 37, 37*a* are formed to correspond to the electrical feed point 30. Upon assembly, the eyelet 33 extends through both of the dielectric boards 17 and 20 through the respective clearance holes 36 and 36*a* while the eyelet 34 similarly extends through the respective clearance holes 37 and 37*a*. Both of the eyelets 33 and 34 extend respectively above and below the upper surface 16 of the dielectric board 17 and the lower surface 19 of the dielectric board 20. Each eyelet is then swaged and soldered at each end to establish suitable electrical connection between the feed traces 27, 28 and respective coupling fingers 14 and 15.

In the preferred embodiment of the present invention, the fourth dielectric board 24 is preferably identical to the dielectric board 20. The dielectric board 24 separates the feed network 18 on the lower surface of the board 20 from a first ground plane 38 formed on the bottom surface 23 of the board 24. The ground plane 38 is preferably the usual thin copper sheet formed integrally with and retained as a laminate of the dielectric board 24.

In the present embodiment, a second ground plane is established between the dielectric boards 17 and 20. This second ground plane is formed as a composite of a pair of retained sheet copper laminates 39 and 40 carried respectively on the lower surface of the dielectric board 17 and the upper surface of the dielectric board 20 (FIGS. 1, 3 and 4). Clearance holes 36 and 37 (FIG. 3) are formed in the copper sheet 39 by the usual etching techniques. Clearance holes 36*a* and 37*a* (FIG. 4) are likewise formed by suitable etching techniques in the copper sheet 40. Upon assembly of the composite antenna structure, the two ground plane sheets 39 and 40 are preferably bonded together using a thin film epoxy adhesive such as "410 Polycast EC" made and sold by Fortin Laminating Corporation. This adhesive has been found particularly effective for copper-to-copper bonding. In effect, such a composite ground plane is thereby securely bonded in such a way as to establish capacitive coupling from one such copper sheet to the other. Where desired, rivets may be used to secure the dielectric boards 17 and 20 together. Bonding with "410 Polycast EC" is preferred, however, to ensure that air pockets are eliminated between the copper sheets 39 and 40 and thereby preserve efficient electrical integrity.

In the assembled composite antenna structure, the integral feed network 18 is sandwiched between the ground plane 38 and the composite ground plane formed by sheets 39 and 40. Since the feed network 18 resides between appropriate ground planes, it constitutes, in effect, a stripline feed circuit for the frequencies of interest and therefore does not radiate. The use of such a stripline feed circuit avoids or at least minimizes losses experienced heretofore in connection with microstrip patch antennas.

Electrical coupling between the standard coax-to-stripline connector 22 (FIG. 1) and the feed network 18 may be accomplished in a variety of suitable ways. For example, the center pin 42 of the connector 22 may extend upwardly through the dielectric board 24 directly to contact a portion of the feed line trace 21 or its output end portion 21*a* (FIGS. 1 and 5).

Figure 6:
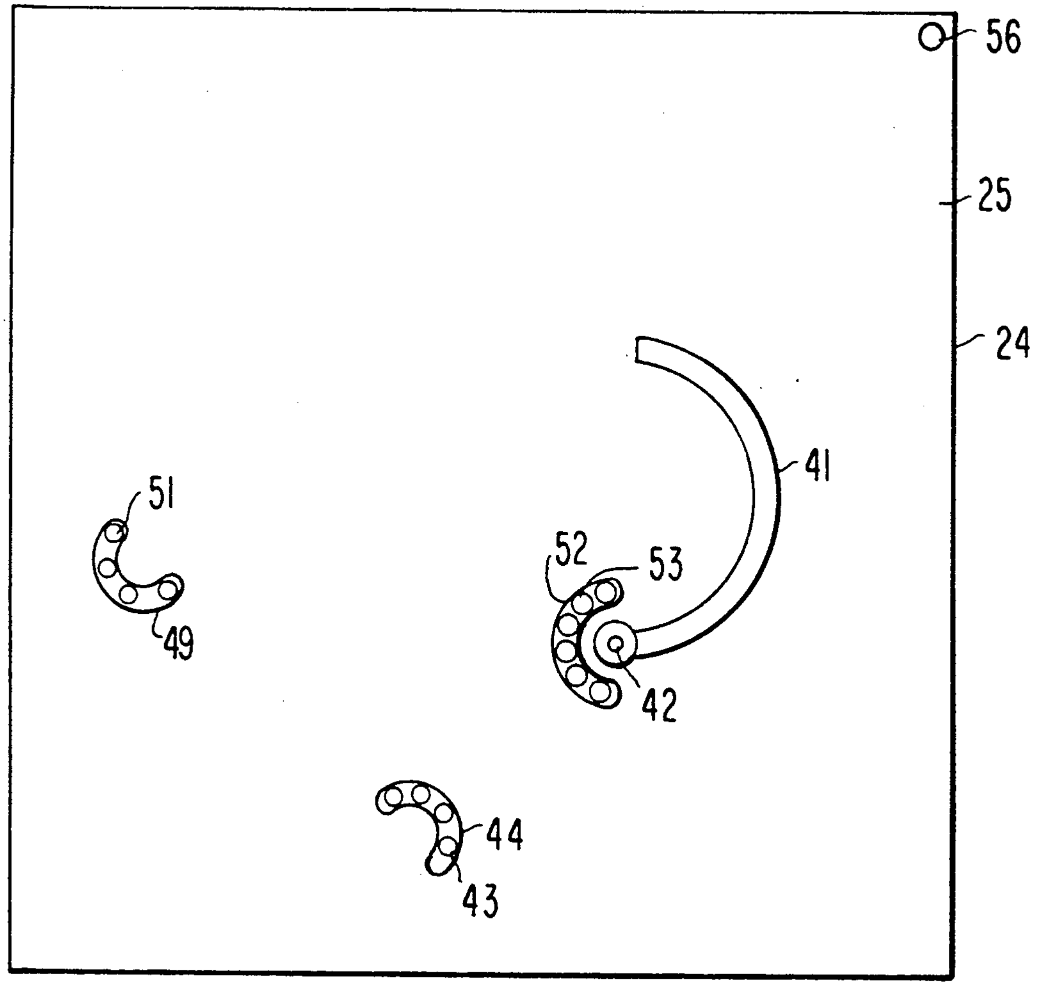
FIG. 6 is a plan view of the upper surface of a fourth dielectric layer of the antenna of FIG. 1.

With reference to FIGS. 1 and 6, it has, however, been found preferable to form a printed circuit transmission line trace 41 on the upper surface 25 of the dielectric board 24. The trace 41 correponds precisely to the configuration and dimensions of a one quarter wavelength section of the output end portion 21*a* of the feed network 18. The position of the trace 41 is predetermined so as to underlie the corresponding section of the output end portion 21*a*. The trace 41 is electrically connected to the connector 22 through the connector center pin 42. In this embodiment, the head of the pin 42 is soldered to the trace 41 and is adapted to be flush with the surface 25 of the board 24. Upon assembly of the composite structure, as described below, the trace 41 and the feed network 18 are capacitively coupled. Such coupling to the feed network 18 provides for ease of assembly and more efficient operation of the antenna over the frequency band of interest.

Referring to FIGS. 1, 5 and 6, means are provided to conduct ground potential to the several copper ground plane sheets 38, 39 and 40. It has been found particularly advantageous electrically to interconnect the ground plane sheets by use of a plurality of electrically conductive penetrating means such as plated through-holes organized in sets such as the set 43 formed in the dielectric board 24 (FIG. 6). Each such set consists of a predetermined alignment of holes extending through one of the dielectric boards 20 and 24. A precisely corresponding set of similarly plated and aligned through-holes 43*a* is formed in the dielectric board 20 (FIG. 5). The interior of each of the through-holes in the sets 43 and 43*a* is plated with copper in such a way as to convert each such hole into a small hollow conducting cylinder. The conductive lining of each of the holes of the set 43 is in electrical contact with the ground plane 38, while the conductive lining of each of the holes of the set 43*a* is in electrical contact with the ground plane 40. At the upper surface 25 of the dielectric board 24, the through-holes of the set 43 are interconnected by a small generally semi-circular conducting trace or dam 44 formed on the surface 25 (FIGS. 1 and 6). At the lower surface 19 of the board 20, the through-holes of the set 43*a* are interconnected by an identical conductive trace or dam 46 formed on the surface 19 (FIGS. 1 and 5). Upon assembly of the antenna, as described below, the dams 44 and 46 overlie one another and are thereby capacitively coupled to conduct ground potential between the ground plane sheets 38 and 40.

The location and configuration of the dams 44 and 46 are selected for close semi-surrounding proximity to the lower end of one of the eyelets, such as eyelet 33, which electrically interconnects the feed network 18 on the lower surface 19 of the board 20 and the coupling finger 14 on the upper surface 16 of the board 17. In essence, each of the dams 44 and 46, in conjunction with the eyelet 33, emulates a short section of transmission line to avoid the otherwise electrically disruptive effect of circuit path discontinuities, i.e., as encountered when the direction of propagation changes from horizontal in the plane of the stripline to a direction perpendicular to the stripline through the eyelet. The number of plated through-holes in each of the sets of holes 43 and 43*a* is preferably four, although other numbers of such holes may be used without departing from the scope of the invention.

In the present embodiment, two additional sets of four similar through-holes are provided respectively in the boards 24 and 20. With reference to FIG. 5, the eyelet 34 is semi-surrounded by a curved dam 47 which interconnects on the lower surface 19 a set 48 of four through-holes formed in the board 20. Similarly, with reference to FIG. 6, a curved semi-circular dam 49 interconnects on the upper surface 25 a set 51 of four through-holes formed in the board 24.

Referring to FIGS. 1 and 6, the output end of the trace 41, in contact with the center pin 42 of the connector 22, is partially surrounded by a semi-circular dam 52 which is similar in shape to, but somewhat larger than the dams 44 and 49. The dam 52 interconnects a set 53 of preferably eight plated through-holes formed in the board 24. With reference to FIG. 5, a dam 54 is formed on the lower surface 19 of the board 20 and corresponds in size and configuration to the dam 52. The dam 54 interconnects a set 53*a* of eight through-holes formed in the board 20. Upon assembly of the composite antenna structure, as described below, each dam of the pair 44, 46, the pair 47, 49 and the pair 52, 54 overlies the other dam of the pair and is thereby capacitively coupled to its mate board-to-board.

The various layers of the antenna structure may be assembled into composite form in various ways. The preferred technique is to bond the juxtaposed dielectric surfaces together with a suitable thin film adhesive. For this purpose it has been found suitable to use a thin film of epoxy dielectric adhesive such as "Polyguide", an adhesive film made and sold under the trademark "Polyguide" by Electronized Chemicals Co. This is a thermally stable co-polymer film particularly well suited to bonding teflon-fiberglass surfaces together. Alternatively, the dielectric boards could be screwed together where desired. Corner-holes 56 may be provided to aid in aligning and assembling the several dielectric layers 13, 17, 20 and 24 into a unitary antenna structure and to mount the composite structure.

Figure 7:
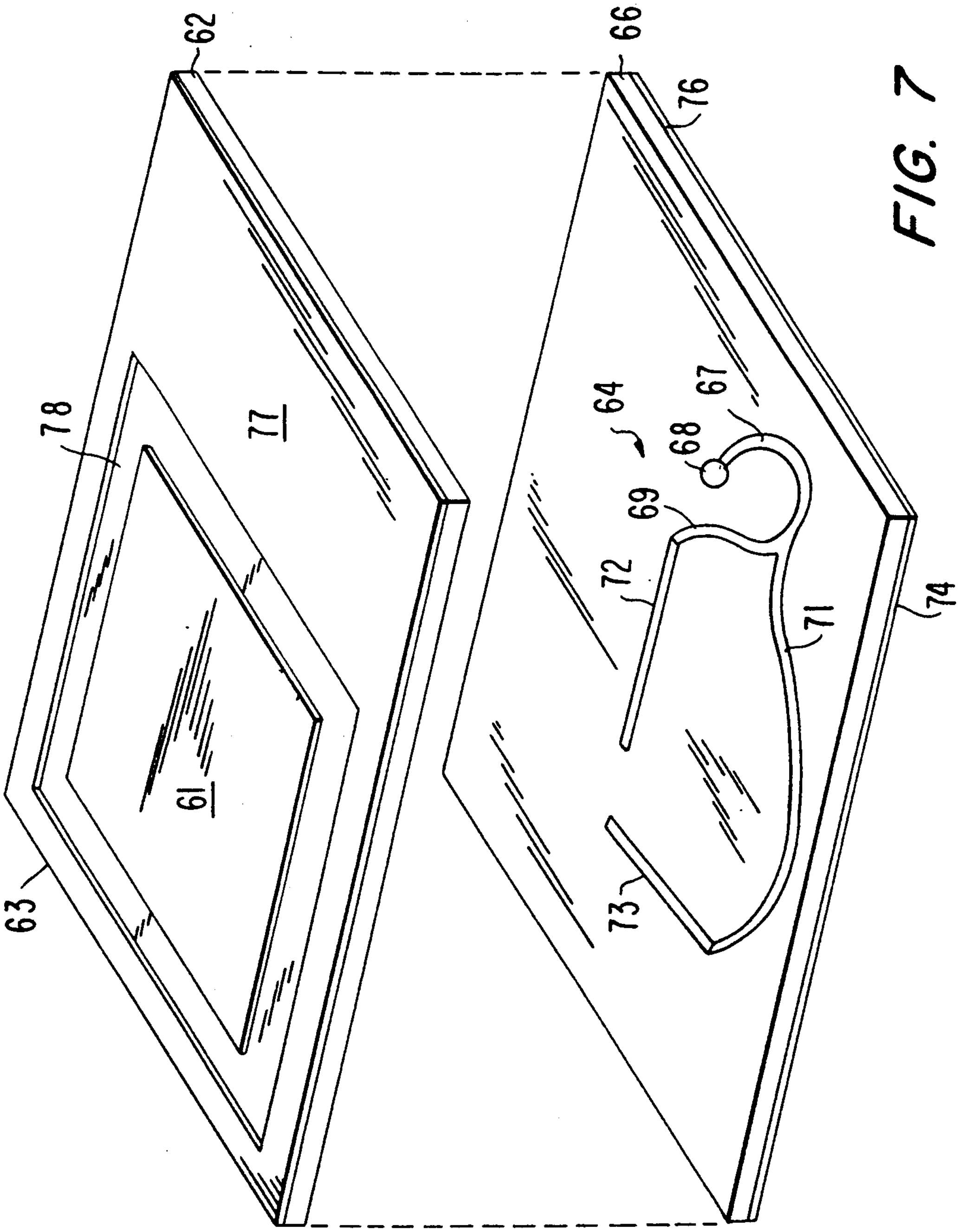
FIG. 7 is a view of an alternate embodiment of the microstrip antenna of the present invention.

With reference to FIG. 7, there is shown an alternate embodiment of the present invention in which fewer layers of dielectric are utilized. In this embodiment, for example, a square microstrip patch antenna 61 is formed on the upper surface of a first rectangular dielectric substrate 62. The patch 61 is situated closer to one edge 63 of the board 62 than to its opposite edge for reasons described in more detail below. The board 62 may be of substantially the same size, configuration and composition as is any of the boards 13, 17, 20 and 24 of the embodiment depicted in FIG. 1. If similar materials of relatively low dielectric constant are used the thickness of the board may be about 0.125 inches. However, the board 62 may be thinner if materials having a relatively higher dielectric constant are employed.

An integrated corporate feed network 64, preferably configured as a power divider and phase shifter circuit to excite circular polarization, may be formed in printed circuit fashion on the upper surface of a second dielectric substrate or board 66, substantially identical in size and shape to the first dielectric board 62. Alternatively, the feed network 64 may be formed on the lower surface of the first dielectric board with no loss of performance. The feed network 64 is similar to the feed network 18 of the embodiment of FIG. 1 and includes a feedline trace 67 emanating from a suitable output 68. The feedline trace 67 is split into a pair of segmented line traces 69 and 71 which terminate in a pair of mutually orthogonal coupling fingers 72 and 73. In this embodiment, unlike the network 18 of FIG. 1, the feedline traces 69, 71 are co-planar with the coupling fingers 72, 73. Output 68 is coupled through a coax-to-stripline connector (not shown) in which the mating center pin slidably or otherwise engages, as desired, one end of the feedline trace 67.

The antenna is assembled by bonding the upper surface of the board 66, which carries the feed network 64 to the lower surface of the board 62 using a suitable thin film epoxy adhesive as described above in connection with FIG. 1. In this embodiment, as in the embodiment of FIG. 1, the coupling fingers 72, 73 are spaced from the antenna patch 61 by the thickness of the dielectric board 62 and are therefore capacitively coupled to the patch 61 at predetermined positions to provide a high performance impedance match thereto.

A ground plane 74 is retained as a metal laminate on the bottom surface 76 of the dielectric board 66. As with the embodiment of FIG. 1, the ground plane 74 covers substantially the entire lower surface 76 thereby extending beneath both the antenna patch 61 and the integrated feed network 64.

Another ground plane 77 is formed as a predetermined portion of the upper surface of the first dielectric board 62. In this embodiment, the antenna patch 61 and the top ground plane 77 may be formed by simply etching a square slot 78 in the otherwise conducting upper surface of the board 62. The exposed dielectric material in the slot 78 insulates the antenna patch 61 from the ground plane 77. In this way the ground plane 77 surrounds the antenna patch 61 and overlies as much of the integrated feed network 64 as possible, with the exception of the coupling fingers 72, 73. The feed network 64 is, accordingly, sandwiched between a pair of ground planes and thereby constitutes, in effect, a stripline medium which cannot radiate.

For some applications, such as for example portable navigation or position locating equipment, it is important that the size of the antenna be as small as possible. Accordingly, a high dielectric constant material, such as is sold by Keene/3M under the trademark "Epsilam -10" ($E_r$=10.2) may also be used to form the dielectric boards 62, 66. The use of "Epsilam -10" brand material permits the dielectric boards 62 and 66 to be relatively thin and thereby facilitates miniaturization of the antenna and its production as an aerodynamic yet small and unobtrusive mount on, for example, a moving vehicle.

Ground potential may be conducted to the top ground plane 77 by any suitable technique. It is preferred for this purpose to use corresponding sets of plated through-holes and associated semi-circular conducting dams, as described in connection with the embodiment of FIG. 1.

Figure 8:
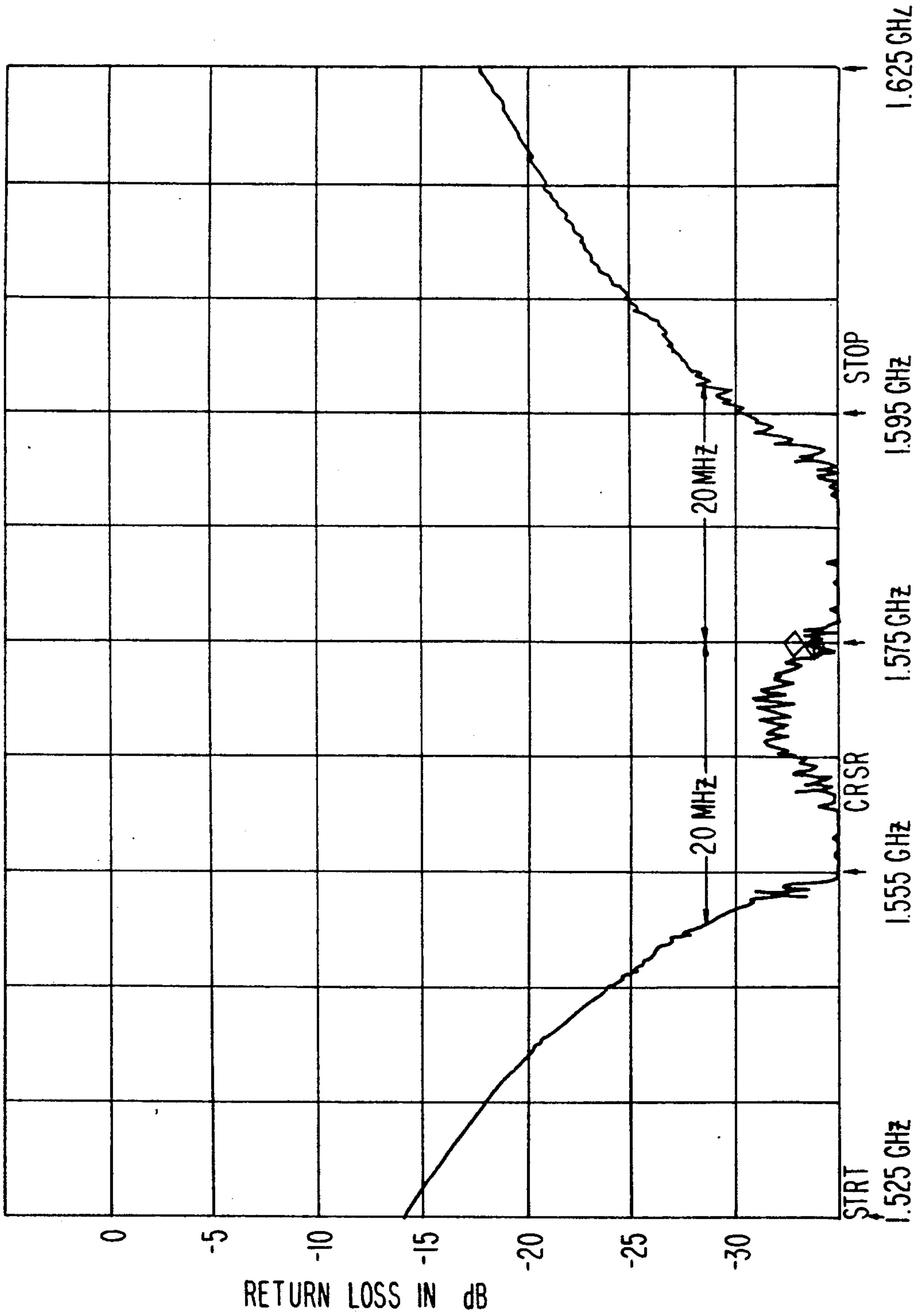
FIG. 8 is a graph showing the return loss of the microstrip antenna of FIG. 1 over the range of 1.525 GHz to 1.625 GHz and indicating a response of −30 dB maintained over a bandwidth of about 40 MHz.

With reference to FIG. 8, there is shown a plot of the return loss of an integrated patch antenna constructed in accordance with the present invention versus frequency. Frequency in GHz is depicted on the horizontal axis and return loss in dB is depicted on the vertical axis. The antenna was tested over a frequency range of from 1.525 GHz to 1.625 GHz. The response curve dips below −30 dB at approximately 1.555 GHz and remains below −30 dB over a bandwidth of about 40 MHz to 1.595 GHz. Such a broad operating bandwidth compensates for dimensional errors in manufacture or for other normal variations in the electrical characteristics of component materials. The need heretofore for precise and costly post-manufacturing tuning of the patch is thereby practically eliminated.

While the invention has been described in light of the preferred embodiments it will be understood by those skilled in the art that various modifications may be made without departing from the scope of the invention. Accordingly, the present invention is not to be limited by the embodiments disclosed herein but only by the spirit and scope of the following claims:

What is claimed is:

1. An antenna comprising:

a plurality of substantially parallel dielectric laminates affixed together to form a composite structure:

an r.f. conductor formed on the exterior of said composite structure substantially parallel to said laminates;

means for capacitively coupling r.f. energy to said r.f. conductor and for exciting propagation from said r.f. conductor of radiation having predetermined polarization characteristics, said coupling means comprising a first transmission line portion substantially parallel to said laminates and first feed coupling means conductively connected to said first transmission line portion and passing through at least a first of said dielectric laminates; and a pair of electrically coupled ground plane conductors formed as conductive laminates of said composite structure above and below said first transmission line portion to shield against loss of radiated energy therefrom, the electrical coupling between said ground plane conductors comprising electrically conductive means penetrating said first of said dielectric laminates and being conductively connected at one end to one of said ground plane conductors and at the other end to a first conductive trace formed on a surface of said first of said dielectric laminates substantially adjacent a juncture between said first transmission line portion and said first feed coupling means in the composite structure.

2. The antenna according to claim 1, in which the surface area of at least one of said ground plane conductors is approximately four times that of said r.f. conductor.

3. The antenna of claim 1, in which said first transmission line portion comprises a first stripline conductor portion.

4. The antenna of claim 3 in which said first transmission line portion is formed on said surface of said first of said dielectric laminates.

5. The antenna of claim 3, in which said r.f. conductor and said first stripline conductor portion are in separate parallel planes separated by at least a second one of said dielectric laminates.

6. The antenna of claim 5, in which said r.f. conductor and said stripline conductor portion are separated by three of said dielectric laminates.

7. The antenna according to claim 1, in which said r.f. conductor comprises a microstrip dipole antenna.

8. The antenna according to claim 7, in which said microstrip dipole antenna comprises a thin square microstrip patch.

9. The antenna of claim 1, in which said coupling means comprises a second transmission line portion substantially parallel to said laminates and electrically connected to said first transmission line portion to carry said r.f. energy to or from said r.f. conductor, said second transmission line portion being between said pair of electrically coupled ground plane conductors and thereby shielded against loss of radiated energy therefrom.

10. The antenna of claim 9, in which said second transmission line portion comprises a second stripline conductor portion formed on a surface of one of said dielectric laminates.

11. The antenna of claim 10, in which said first and second transmission line portions are formed on the same surface of a dielectric laminate of said composite structure.

12. The antenna of claim 10, in which said first and second transmission line portions are formed on respective surfaces of different ones of the dielectric laminates of said composite structure.

13. The antenna of claim 10, in which said second stripline conductor portion comprises shielded power splitting and phase shifting portions and an integral coupling portion.

14. The antenna according to claim 13, in which said power splitting and phase shifting portions comprise an integral pair of printed circuit traces commonly fed and different in total length by a predetermined amount thereby to cause the propagation of elliptically polarized radiation from said r.f. conductor.

15. The antenna of claim 13, in which said power splitting, phase shifting and integral coupling portions are in substantially the same plane.

16. The antenna of claim 12, in which said first transmission line portion and said second transmission line portion overlie one another to define electrical coupling therebetween in the composite structure.

17. The antenna of claim 14, in which said coupling means comprises second feed coupling means conductively connected to said second transmission line portion and passing through at least a second one of said dielectric laminates.

18. The antenna of claim 17, in which said second feed coupling means comprises at least a first thin conductive cylinder electrically connected at one end to one of said printed circuit traces defining said phase shifting and power splitter portions of said second transmission line portion.

19. The antenna of claim 18, in which said second feed coupling means comprises a second one of said conductive cylinders, said second conductive cylinder being connected at one end to the other of said printed circuit traces defining said phase shifting and power splitting portions of said second transmission line portion.

20. The antenna according to claim 1, in which said electrically conductive means comprises a first plurality of conductively plated through-holes.

21. The antenna of claim 20, in which said electrically conductive means comprises a second plurality of conductively plated through-holes penetrating a second of said dielectric laminates, each of said second plurality of through-holes being conductively connected at one end to another of said ground plane conductors and electrically interconnected at the other end to a second conductive trace, said second conductive trace being formed on a surface of said second dielectric laminate and substantially adjacent said juncture between said first transmission line portion and said first feed coupling means in the composite structure.

22. The antenna according to claim 21, in which said first and second conductive traces are substantially semi-circular and overlie one another to define electrical coupling therebetween in the composite structure.

23. The antenna of claim 19, in which the other end of each of said first and second conductive cylinders is connected to one of a pair of substantially orthogonal coupling fingers, each of said coupling fingers being formed as a printed circuit trace on a surface of one of said dielectric laminates.

24. The antenna of claim 23, in which said coupling fingers are separated from said second transmission line portion by at least one of said dielectric laminates.

25. The antenna of claim 24, in which said coupling fingers are separated from said second transmission line portion by two of said dielectric laminates.

26. The antenna of claim 25, in which one of said electrically coupled ground plane conductors is between said coupling fingers and said second transmission line portion.

* * * * *